(12) United States Patent
Ooba (10) Patent No.: US 11,230,005 B2
(45) Date of Patent: Jan. 25, 2022

(54) FOLLOWING ROBOT AND WORK ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 215 days.

(21) Appl. No.: 16/746,102

(22) Filed: Jan. 17, 2020

(65) Prior Publication Data
US 2020/0238518 A1 Jul. 30, 2020

(30) Foreign Application Priority Data
Jan. 24, 2019 (JP) .............................. JP2019-010335

(51) Int. Cl.
*B25J 9/16* (2006.01)
*B25J 9/10* (2006.01)
*B25J 19/04* (2006.01)

(52) U.S. Cl.
CPC ........... *B25J 9/1664* (2013.01); *B25J 9/1005* (2013.01); *B25J 9/1653* (2013.01); *B25J 9/1697* (2013.01); *B25J 19/04* (2013.01)

(58) Field of Classification Search
CPC ...... B25J 9/1664; B25J 9/1697; B25J 9/1005; B25J 19/04; B25J 9/1653; B25J 9/0093; B25J 13/085; B25J 19/023; B25J 9/0084; G05B 2219/39102; G05B 2219/39106; B65G 47/90; B65G 43/00
(Continued)

(56) References Cited

U.S. PATENT DOCUMENTS 4,831,549 A * 5/1989 Red ..................... B25J 9/1692
                                                    700/254
6,163,946 A * 12/2000 Pryor ................ A01B 69/008
                                                   29/407.04
(Continued)

FOREIGN PATENT DOCUMENTS

JP   H0872764 A    3/1996
JP   2001275045 A  10/2001
(Continued)

OTHER PUBLICATIONS

Japanese Notice of Reasons for Refusal dated Mar. 16, 2021, for Japanese Patent Application No. 2019010335.

*Primary Examiner* — Jaime Figueroa
(74) *Attorney, Agent, or Firm* — Karceski IP Law, PLLC (57) ABSTRACT

A robot includes an arm, one or more visual sensors provided on the arm, a storage unit that stores a first feature value regarding at least a position and an orientation of a following target, the first feature value being stored as target data for causing the visual sensors provided on the arm to follow the following target, a feature value detection unit that detects a second feature value regarding at least a current position and a current orientation of the following target, the second feature value being detected using an image obtained by the visual sensors, a movement amount calculation unit that calculates a movement command for the arm based on a difference between the second feature value and the first feature value, and a movement command unit that moves the arm based on the movement command.

9 Claims, 5 Drawing Sheets

(58) Field of Classification Search
USPC .......................................... 700/253, 245–264
See application file for complete search history.

(56) References Cited

U.S. PATENT DOCUMENTS

| | | | | |
|---|---|---|---|---|
| 8,655,429 | B2* | 2/2014 | Kuduvalli | H05H 7/00 600/407 |
| 9,586,321 | B2* | 3/2017 | Maruyama | B25J 19/023 |
| 2002/0036617 | A1* | 3/2002 | Pryor | G06F 3/011 345/156 |
| 2004/0167671 | A1* | 8/2004 | Aoyama | G06T 7/593 700/259 |
| 2004/0266276 | A1* | 12/2004 | Hariki | H01R 43/26 439/894 |
| 2006/0184272 | A1* | 8/2006 | Okazaki | B25J 9/1697 700/245 |
| 2009/0003975 | A1* | 1/2009 | Kuduvalli | A61N 5/1049 414/146 |
| 2012/0004774 | A1* | 1/2012 | Umetsu | B25J 15/0009 700/254 |
| 2012/0209429 | A1* | 8/2012 | Yamaguchi | B25J 9/1697 700/259 |
| 2014/0309762 | A1* | 10/2014 | Hayata | B25J 9/1682 700/114 |
| 2014/0376768 | A1* | 12/2014 | Troy | G01S 3/7864 382/103 |
| 2015/0105908 | A1* | 4/2015 | Ivanov | B25J 9/1697 700/259 |
| 2015/0343641 | A1* | 12/2015 | Maruyama | B25J 9/1697 700/259 |
| 2017/0080562 | A1* | 3/2017 | Tsuzaki | B25J 9/1633 |
| 2017/0106540 | A1* | 4/2017 | Watanabe | B25J 9/1697 |
| 2017/0274534 | A1 | 9/2017 | Takahashi et al. | |
| 2018/0333849 | A1 | 11/2018 | Sugio | |
| 2019/0015973 | A1 | 1/2019 | Ooba | |

FOREIGN PATENT DOCUMENTS

| | | |
|---|---|---|
| JP | 2003211381 A | 7/2003 |
| JP | 2007112565 A | 5/2007 |
| JP | 2007218687 A | 8/2007 |
| JP | 2007265343 A | 10/2007 |
| JP | 2010131685 A | 6/2010 |
| JP | 2014123304 A | 7/2014 |
| JP | 2017170599 A | 9/2017 |
| JP | 2018192579 A | 12/2018 |

* cited by examiner

FOLLOWING ROBOT AND WORK ROBOT SYSTEM

CROSS-REFERENCE TO RELATED APPLICATIONS

This application is based on and claims priority to Japanese Patent Application No. 2019-010335, filed on Jan. 24, 2019, the content of which is incorporated herein by reference in its entirety.

FIELD OF THE INVENTION

The present invention relates to a following robot and a work robot system.

BACKGROUND OF THE INVENTION

A conventional known production line includes a robot, a transfer device that transfers an article, rails provided along the transfer device, and a moving device that moves the robot along the rails (for example, see Japanese Unexamined Patent Application, Publication No. H08-72764). In this production line, the robot performs defect inspection and polishing on the article while the article is being transferred by the transfer device. While the defect inspection and polishing are performed, the moving device moves the robot along the rails at the same speed as the speed at which the article is transferred by the transfer device.

Also, techniques are known which precisely calibrate the position and the orientation of the distal end of the robot with respect to a stationary target position (for example, see Japanese Unexamined Patent Application, Publication No. 2017-170599).

SUMMARY OF THE INVENTIONS

A first aspect of the present disclosure is directed to a following robot which includes a movable arm; one or more visual sensors provided on the arm; a storage unit that stores a first feature value regarding at least a position and an orientation of a target to be followed, the first feature value being stored as target data for causing the visual sensors provided on the arm to follow the target to be followed; a feature value detection unit that detects a second feature value regarding at least a current position and a current orientation of the following target, the second feature value being detected using an image obtained by the visual sensors; a movement amount calculation unit that calculates a movement command for the arm based on a difference between the second feature value and the first feature value; and a movement command unit that moves the arm based on the movement command, wherein the movement amount calculation unit and the movement command unit repeat calculation of the movement command and movement of the arm based on the movement command while the visual sensor is made to follow the following target, wherein the movement command is a command that reduces or eliminates a difference between the orientation of the following target as the second feature value and the orientation of the following target as the first feature value.

A second aspect of the present disclosure is directed to a work robot system which includes a transfer device that transfers an article; and the above-described following robot, wherein, in a state where the visual sensor of the following robot is following the following target, the following robot performs a predetermined task on the article, or a work robot, which is another robot, performs the predetermined task on the article by using information of the movement command to cause the visual sensor of the following robot to follow the following target or information used in calculation of the movement command.

DESCRIPTION OF EMBODIMENT(S) OF THE INVENTION

A work robot system 1 according to an embodiment will be described below with reference to the drawings.

Figure 1:
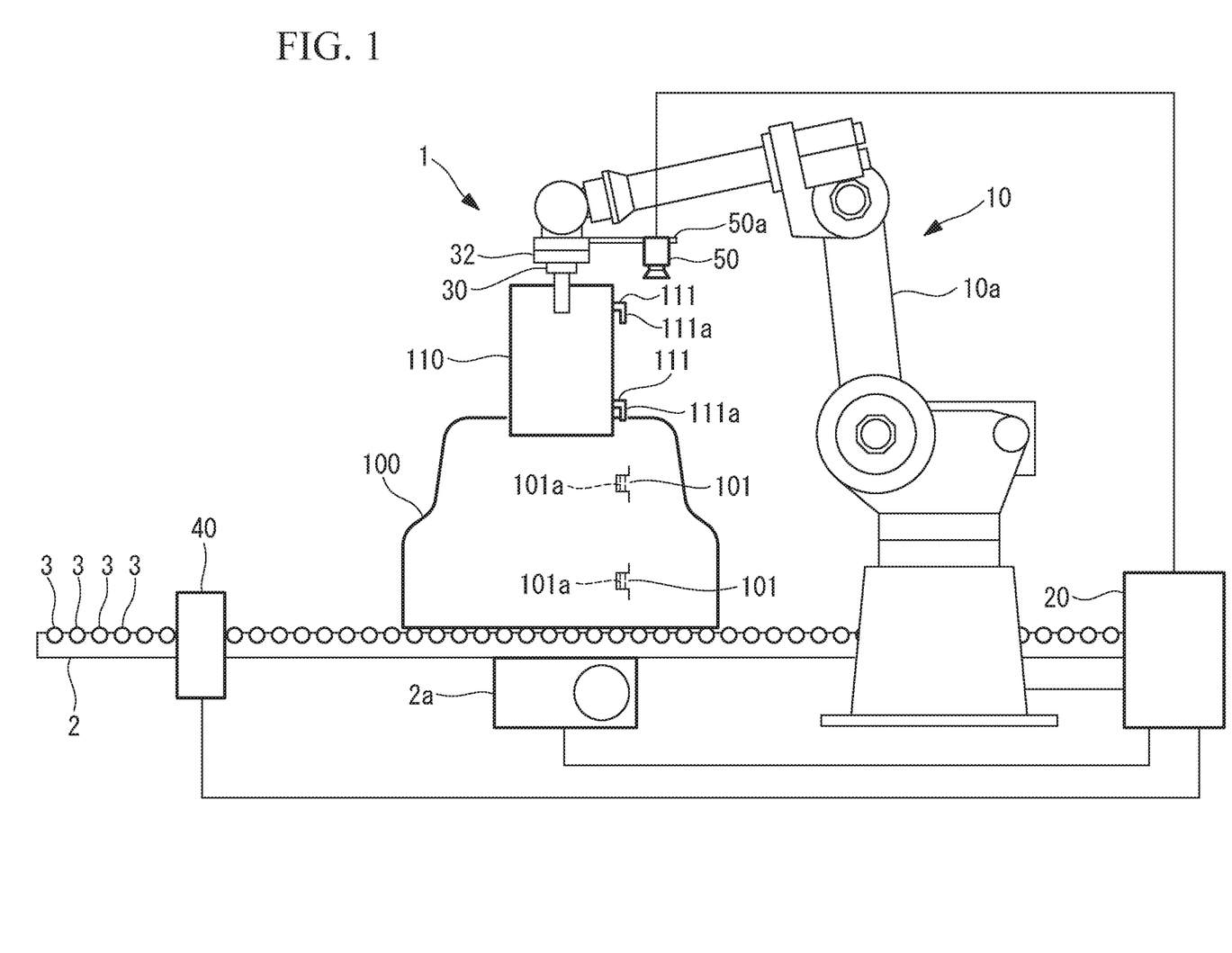
FIG. 1 is a schematic configuration view of a work robot system of an embodiment.

As illustrated in FIG. 1, the work robot system 1 according to this embodiment includes a transfer device 2 that transfers an article 100 which is an object on which a task should be performed, a robot (following robot) 10 that performs a predetermined task on a work-target portion 101 of the article 100 being transferred by the transfer device 2, a controller 20 that controls the robot 10, a detection device 40, which is a detector in the context of the present invention, and a visual sensor 50 mounted on the robot 10.

The detection device 40 detects whether or not the article 100 has been transferred to a predetermined position. It is possible to use any device that has such functionality as the detection device 40. While the detection device 40 is a photoelectric sensor in this embodiment, the visual sensor 50 may detect whether or not the article 100 has been transferred to the predetermined position.

The article 100 is not limited to a specific type. In this embodiment, for example, the article 100 is a body of a vehicle. The transfer device 2 transfers the article 100 by driving of a plurality of rollers 3 which are driven by a motor 2a and, in this embodiment, the transfer device 2 transfers the article 100 toward the right side in FIG. 1.

The work-target portions 101 are portions of the article 100 on which the robot 10 performs the predetermined task. In this embodiment, as the predetermined task, a hand 30 (i.e., a tool) of the robot 10 lifts up a component 110 and the robot 10 mounts mounting portions 111 of the component 110 onto the work-target portions 101. As a result of this, for example, shafts 111a extending downward from the mounting portions 111 of the component 110 are brought into fitting engagement with holes 101a provided at the work-target portions 101 of the article 100.

It should be noted that the robot 10 mounts the mounting portions 111 of the component 110 onto the work-target portions 101 in a state where the article 100 is being moved by the transfer device 2.

Figure 2:
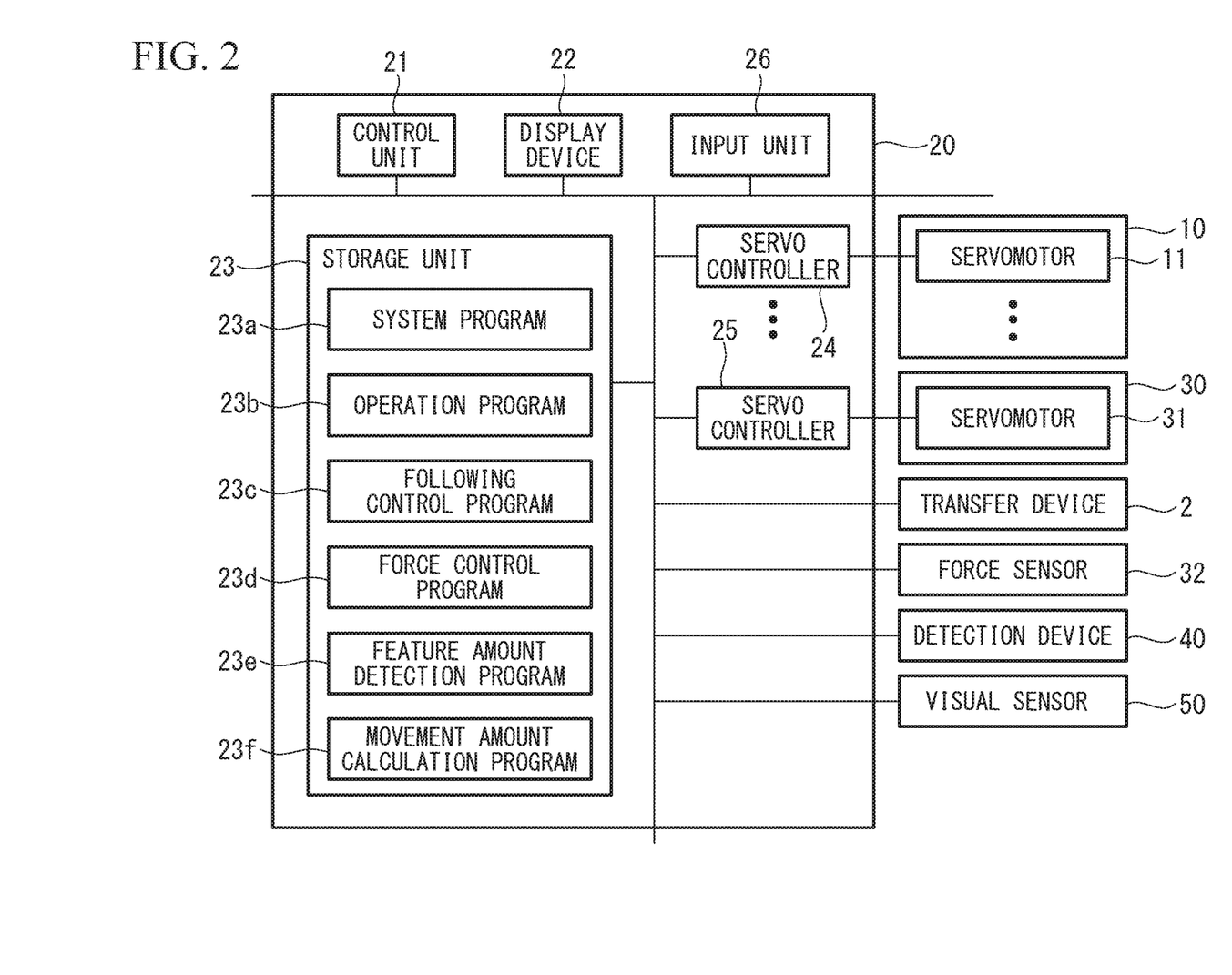
FIG. 2 is a block diagram of a controller of the work robot system of this embodiment.

Whilst the robot 10 is not limited to a specific type, the movable arm 10a of the robot 10 of this embodiment includes a plurality of servomotors 11 that individually drive a plurality of movable parts (see FIG. 2). Each servomotor 11 has an operating position detection device that detects an operating position of the servomotor 11, and for example, this operating position detection device is an encoder. A detection value of the operating position detection device is transmitted to the controller 20.

The hand 30 is mounted at a distal end of the arm 10a. The hand 30 of this embodiment supports the component 110 by grasping the component 110 with a plurality of claws, but a hand that supports the component 110 by using magnetic force, air suctioning, or other means can also be used.

The hand 30 includes a servomotor 31 that drives the claws (see FIG. 2). The servomotor 31 has an operating position detection device that detects an operating position of the servomotor 31, and for example, this operating position detection device is an encoder. A detection value of the operating position detection device is transmitted to the controller 20.

It should be noted that, as the servomotors 11, 31, various types of servomotors, including a rotary motor and a linear motor, can be used.

A force sensor (force detector) 32 is mounted at the distal end of the robot 10. For example, the force sensor 32 measures forces or moments in the directions parallel to an X-axis, a Y-axis, and a Z-axis illustrated in FIG. 3 and forces or moments around the X-axis, the Y-axis, and the Z-axis. The force sensor 32 may be any sensor that can detect the direction and the magnitude of a force applied to the hand 30 or the component 110 grasped by the hand 30. For this purpose, the force sensor 32 is provided between the robot 10 and the hand 30 in this embodiment, but the force sensor 32 may instead be provided inside the hand 30.

The visual sensor 50 is mounted at the distal end of the arm 10a. In one example, the visual sensor 50 is mounted on a wrist flange of the robot 10 using the frame 50a. In this embodiment, the visual sensor 50 is a two-dimensional camera. The visual sensor 50 of this embodiment successively acquires pieces of image data of the target 102 to be followed as illustrated in FIG. 3, in a state where target 102 to be followed whose position and orientation do not change relative to the work-target portion 101 appears within the predetermined range of the angle of view.

Figure 3:
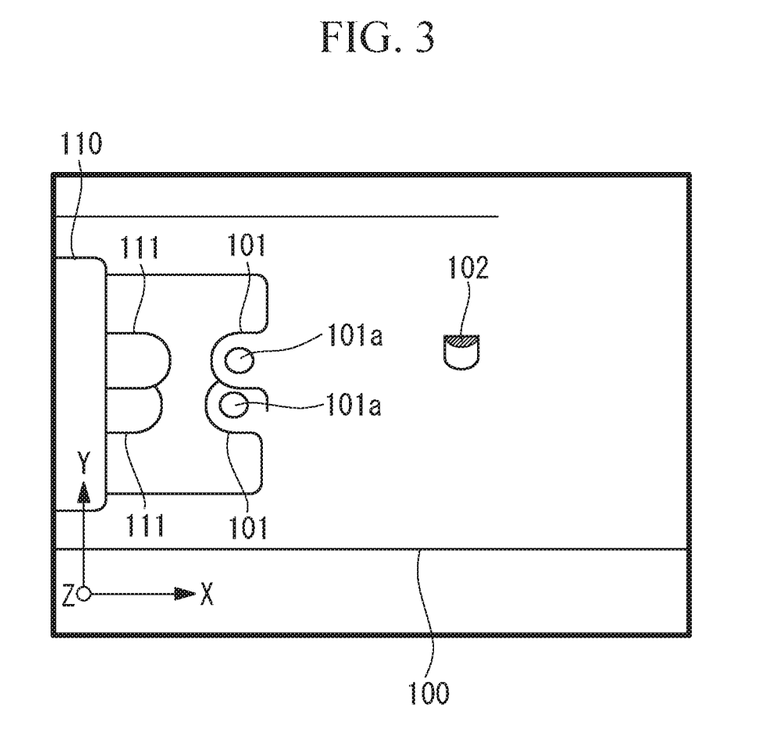
FIG. 3 is an example of an image data captured by a visual sensor of the work robot system of this embodiment.

Whilst the target 102 to be followed in this embodiment correspond to the upper surface portion indicated with the hatching lines in FIG. 3, it is also possible to use any other portions whose position and orientation do not change relative to the work-target portion 101.

It should be noted that the visual sensor 50 may be mounted on a tool such as the hand 30. Also, the visual sensor 50 may be mounted at any other portion of the robot 10 whose relative position and orientation do not change relative to the tool such as the hand 30.

The visual sensor 50 successively transmits the image data to the controller 20. The image data is data by which the position and the orientation of target 102 to be followed can be specified. The image data may be processed by a detector other than the controller 20 and the position and the orientation of the target 102 to be followed may be identified on the basis of the processed data.

The target 102 to be followed may be a portion of the article 100 having a predetermined shape, a portion with a predetermined mark provided thereon, etc. In these cases, the image data is a piece of data by which the position and the orientation of the aforementioned portion can be identified on the image.

In one example of an image-base process, when the target 102 to be followed is arranged at a target position, with a orientation, or with a size, of the image data (detection area) in the visual sensor 50, then the position and the orientation of the hand 30 mounted on the arm 10a is placed at a position and with an orientation necessary for the predetermined task on the article 100. In one example of a position-base process, and in the case where the position and the orientation of the hand 30 mounted on the arm 10a and the position and the orientation of the visual sensor 50 are made to correspond to each other through calibration, the controller 20 recognizes the position and the orientation of the target 102 to be followed in the coordinate system of the robot 10 on the basis of the image data and the controller 20 can move the hand 30 provided on the arm 10a to the position and the orientation necessary for the aforementioned predetermined task. In this embodiment, a state is made where the shafts 111a of the mounting portions 111 of the component 110 can be brought into fitting engagement with the holes 101a provided in the work-target portions 101 of the article 100. It should be noted that the article 100 may oscillate on the transfer device 2 in some cases. For example, in a case where the plurality of rollers 3 of the transfer device 2 are not arranged in a perfect plane, the article 100 oscillates. If the article 100 is large, a slight oscillation of article 100 at its lower side may lead to a large oscillation of the work-target portion 101. in view of this, adjustment of the orientation of the hand 30 provided on the arm 10a is important.

In one example of the image-base process, a change in the position, orientation, size, and the like of the target 102 to be followed in the image data of the visual sensor 50 and the change in the position and the orientation of the coordinate system of the robot 10 are made to correspond to each other in advance in the controller 20.

As illustrated in FIG. 2, the controller 20 includes: a control unit 21 having a CPU, a RAM, and the like; a display device 22; a storage unit 23 having a non-volatile storage unit, a ROM, and the like; a plurality of servo controllers 24 respectively corresponding to the servomotors 11 of the robot 10; a servo controller 25 corresponding to the servomotor 31 of the hand 30; and an input unit 26 connected to the controller 20.

In one example, the input unit 26 is an input device, such as a control panel, which an operator can carry. In some cases, the input unit 26 wirelessly communicates with the controller 20.

A system program 23a is stored in the storage unit 23, and the system program 23a covers basic functions of the controller 20. Also, the operation program 23b is also stored in the storage unit 23. In addition, a following control program (movement command means) 23c, a force control program 23d, a feature value detection program (feature value detection means) 23e, and a movement amount calculation program (movement amount calculation means) 23f are stored in the storage unit 23.

Based on these programs, the control unit 21 transmits movement commands for performing the predetermined task on the article 100 to the individual servo controllers 24, 25. As a result of this, the robot 10 and the hand 30 perform the predetermined task on the article 100.

Figure 4:
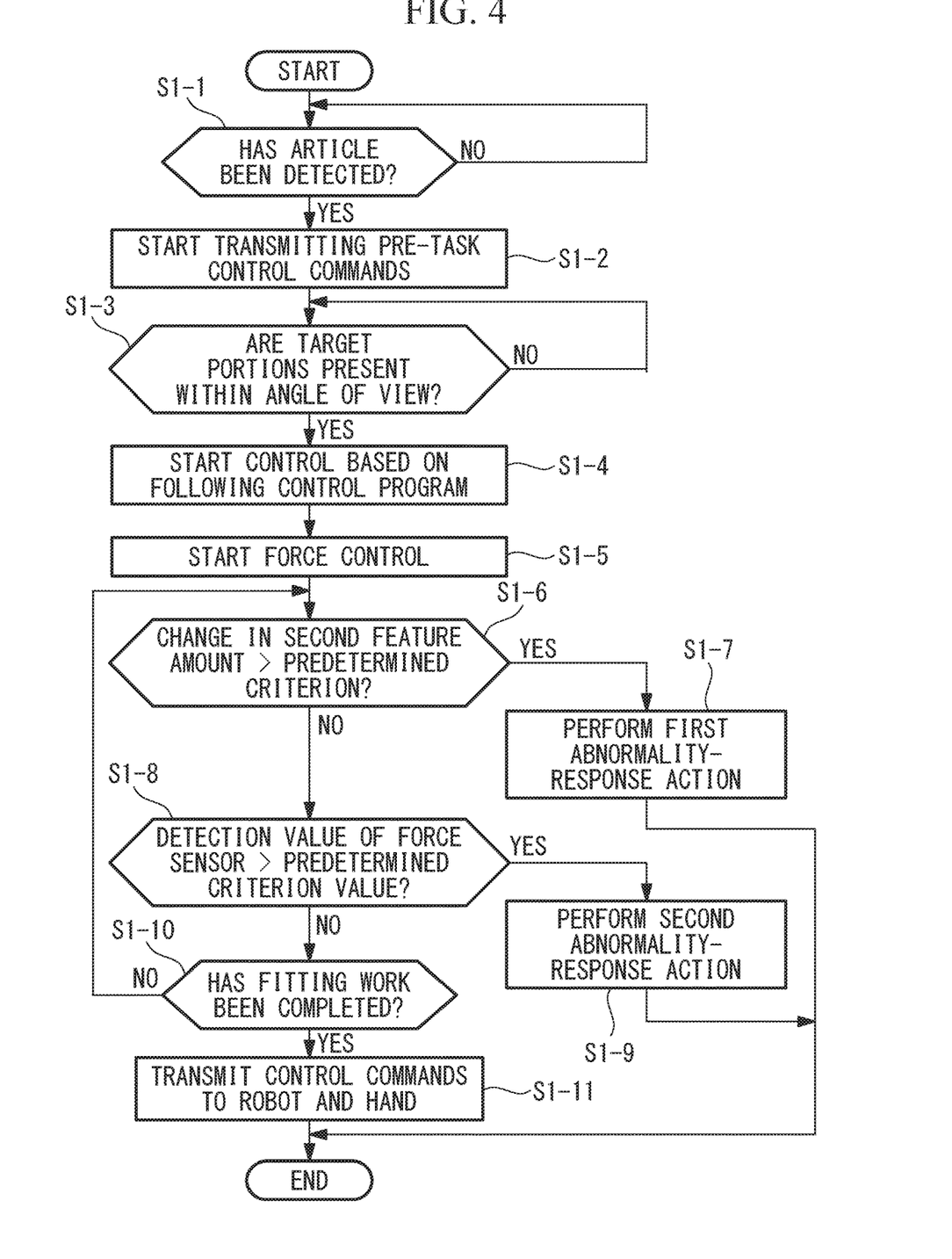
FIG. 4 is a flowchart illustrating an operation of a control unit of the work robot system of this embodiment.

Operation of the control unit 21 in this process will be described with reference to the flowchart of FIG. 4.

First, when the article 100 is detected by the detection device 40 (step S1-1), the control unit 21 starts transmitting pre-task movement commands to the robot 10 and the hand 30 based on the operation program 23b (step S1-2). As a result of this, the robot 10 brings the shafts 111a of the component 110 grasped by the hand 30 closer to the holes 101a of the work-target portion 101. At this point, the control unit 21 may use data such as the transfer speed of the transfer device 2 or the positions of the work-target portions 101 of the article 100.

Also, after the step S1-4 which will be described later, the shafts 111a of the component 110 are brought into fitting engagement with the holes 101a of the article 100 on the basis of the operation program 23b. It should be noted that, in the step S1-1, the article 100 may be detected by the visual sensor 50 in place of the detection device 40.

As a result of the control of the robot 10 in the step S1-2, the component 110 reaches the ready position and orientation for a predetermined task (fitting engagement). As a result of this, when the target-of 102 to be followed has thus become present within an angle of view (detection area) of the visual sensor 50 or within a predetermined range of the angle of view (step S1-3), then the control unit 21 starts control based on the following control program 23c, the feature value detection program 23e, and the movement amount calculation program 23f (step S1-4). For example, the below-described control is performed at the step S1-4.

It should be noted that, in the below-described control, at least the position and the orientation of the target 102 to be followed are detected on the basis of the image data of the visual sensor 50 and the control unit 21 causes the position and the orientation of the visual sensor 50 mounted to the arm 10a to follow the target 102 to be followed on the basis of the position and the orientation that have been detected. Here, since the position and the orientation of the visual sensor 50 relative to the hand 30 are fixed, the hand 30 of the robot 10 follows the article 100 in such a manner that the target 102 followed is always arranged at the target position and with the target orientation in the image data of the visual sensor 50.

Such control is implemented, for example, through the below-described control.

According to this control, the target position, the target orientation, and the target size with which the target 102 to be followed should be arranged in the image data are stored as the first feature value in the storage unit 23. The target size may be the size of the contour in the case where the contour is relied on as the feature.

The control unit 21 detects, as detection of the second feature value, the position, the orientation, and the size of the target 102 to be followed on the pieces of image data successively obtained by the visual sensor 50 on the basis of the feature value detection program 23e.

For example, the control unit 21 performs matching search between a projective-transformation model and the target 102 to be followed in the image data while performing projective transformation on the model of the target 102 to be followed stored in the storage unit 23 and thereby detects the position and the orientation of the target 102 to be followed. The model may be created using CAD data or the like or may be created from an actual target. Since the relative position and the relative orientation of the work-target portion 101 relative to the target 102 to be followed are fixed, the control unit 21 can obtain the relative position and the relative orientation of the distal end of the arm 10a relative to the target 102 to be followed on the basis of the position and the orientation of the target 102 to be followed.

The control unit 21 calculates, on the basis of the movement amount calculation program 23f, a movement command for making the position, the orientation, and the size of the target 102 to be followed in the image data match the first feature value.

The movement command that has been calculated are for use in eliminating or reducing the difference between the position, the orientation, and the size of the target 102 to be followed in the image data and the first feature value. The movement command that has been calculated is used, for example, to change the position of the hand 30 mounted on the arm 10a in the X-axis direction, the Y-axis direction, and the Z-axis direction and the orientation of the hand 30 about the X-axis, the Y-axis, and the Z-axis.

It should be noted that, in the aforementioned control, the control unit 21 may further adjust the movement command that has been calculated on the basis of parameters defined according to a mechanical characteristic of the arm 10a. For example, the moment to which the arm 10a is subjected due to the rigidity of the entire arm 10a or part of it, the rigidity of the individual movable parts, the weight of the hand 30, the weight of the component 110, the weight of the hand 30 and the component 110, and the like are included in the aforementioned mechanical characteristic. Also, since the amount of deflection, its direction etc. of the arm 10a changes according to the angle of a joint, which is a movable part of the arm 10a, the states of the individual movable parts of the arm 10a are also included in the aforementioned mechanical characteristic.

In other words, when the posture of the arm 10a changes due to the movement command, the moment to which the arm 10a is subjected due to the weight of the hand 30 and the component 110 or the like, the states of the individual movable parts of the arm 10a, and the like change according to the change in the posture. By virtue of this, when the movement command is adjusted with these mechanical characteristics taken into account, the hand 30 can more accurately follow the article 100.

The control unit 21 can obtain the tendency of the change in the second feature value using a plurality of successive pieces of image data. For example, when the position, the orientation, and the size of the target 102 to be followed in the image data of the visual sensor 50 are gradually moving to be closer to the first feature value, which is the target data, then the tendency of the change in the relative positions and the relative orientations of the visual sensor 50 relative to the target 102 to be followed can be grasped from a plurality of successive pieces of image data.

If the aforementioned relative position and the aforementioned relative orientation shows the tendency of the change, then the control unit 21 may adjust the movement command using feedforward control based on the aforementioned tendency on the basis of the movement amount calculation program 23f For example, an average speed may be determined from the change in the movement amount and a basic speed thereof may be given as the feedforward control. By using the feedforward control, the amount of deviation can be controlled by the feedback control in a state where the relative speed with respect to the target is maintained at a constant level to a certain extent. If feedforward is not implemented, then a moment may occur at which transfer speed of the robot becomes zero when the features of the images match with each other, In this case, it is possible that deceleration and acceleration occur frequently, but such deceleration and acceleration can be prevented by implementing feedforward control. The correction data to be used in the feedforward is preferably subjected to well-known filtering process such as moving average, a smoothing process, etc. As a result of this, when the change in the position and the orientation of the article 100 due to disturbance, oscillation of the article 100 caused by the accuracy of the transfer device 2, possibility of overshoot, electrical noise, and the like have been identified, then the control unit 21 is allowed to make an appropriate response to the change due to the disturbance or the oscillation caused by the accuracy of the transfer device 2, achieve reduction in the overshoot, and removal of the electrical noise, and the like.

It should be noted that the input values such as the basic speed to be given in the feedforward control may voluntarily be input on the basis of those that have been measured by an external measurement instrument.

Also, a robot model may be created which takes into account the deflection (torsion) of a reducer to reduce the oscillation of the arm through estimation and feedback of the oscillation of the arm.

Also, the control unit 21 may perform interpolation of the results of detection of the second feature value by using the tendency of the change in the aforementioned relative position and the aforementioned relative orientation. By virtue of this, even in a case where the cycle of acquisition of the second feature value is long in the same manner as the cycle of capturing of images by the visual sensor 50, through the interpolation of the detection results the estimation of the second feature value in the middle of the acquisition cycle and the estimation of the second feature value in the future, and the like become possible.

By virtue of the above-described control, the control unit 21 causes the hand 30 of the arm 10*a* to follow the work-target portion 101. As a result of this, the position and the orientation of the shafts 111*a* of the mounting portions 111 of the component 110 and the position and the orientation of the holes 101*a* of the work-target portions 101 match with each other.

Here, as described above, the change in the position, the orientation, and the size of the target 102 to be followed on the image data of the visual sensor 50 and the change in the position and the orientation of the coordinate system of the robot 10 are made to correspond to each other in the controller 20. By virtue of this, when the visual sensor 50 is following the target 102 to be followed, the coordinate system of the robot 10 moves in the transfer direction of the transfer device 2, and the position and the orientation of the coordinate system can be made identical to the movement of the article 100 by the transfer device 2. In this situation, while the work-target portion 101 of the article 100 is being moved by the transfer device 2, the work-target portion 101 will be seen as if it stopped in the coordinate system when viewed from the control unit 21.

In the state of the above-described controlled, the control unit 21 starts the force control based on the force control program 23*d* (step S1-5).

Publicly known force control can be used as the force control. In this embodiment, the robot 10 moves the component 110 in a direction away from the force detected by the force sensor 32. The amount of this movement is determined by the control unit 21 in accordance with the detection value of the force sensor 32.

For example, when the shafts 111*a* of the component 110 grasped by the hand 30 and the holes 101*a* of the article 100 start to be brought into fitting engagement and, in this situation, the force in the opposite direction from the transfer direction of the transfer device 2 is detected by the force sensor 32, then the control unit 21 slightly moves the component 110 in the opposite direction from the transfer direction, away from the detected force.

Subsequently, when the second feature values successively detected on the basis of the image data of the visual sensor 50 vary beyond a predetermined criterion (step S1-6), the control unit 21 performs a first abnormality-response action (step S1-7). The variation beyond the predetermined criterion refers to a significant movement of the target 102 to be followed in the image data, a movement at a speed higher than a predetermined speed of the target 102 to be followed in the image data, or the like.

When power supply is not stable, the rotation speed of the motor 2*a* may decrease rapidly. Thus, the rotation speed of the motor 2*a* varies significantly in some cases. In such cases, the positions of the target 102 to be followed relative to the distal end of the arm 10*a* will vary beyond the aforementioned predetermined criterion.

As the first abnormality-response action, the control unit 21 performs an action of shortening the control cycle, or enhancing the sensitivity, of the force control, an action of stopping the progress of fitting engagement, an action of stopping the operation of the fitting engagement, an action of evacuation in an opposite direction from the fitting engagement direction, an action of stopping the transfer, or any combination of these actions, etc. Shortening the control cycle, or enhancing the sensitivity, of the force control can cause the robot 10 to move with higher responsiveness upon application of a force to the component 110. In this embodiment, the control unit 21 performs an action of stopping the operation of fitting engagement, an action of evacuation in an opposite direction from the fitting engagement direction, an action of stopping the transfer device, or an action of combination of these actions, etc.

Also, when the detection value of the force sensor 32 exceeds a predetermined criterion value (step S1-8), the control unit 21 performs a second abnormality-response action (step S1-9). When the detection value of the force sensor 32 exceeds the predetermined criterion value, it is highly likely that an abnormal force is applied to the component 110, the article 100, etc. Accordingly, as the second abnormality-response action, the control unit 21 performs an action of stopping the robot 10, an action of moving the robot 10 in a direction away from the direction of the force detected by the force sensor 32, an action of stopping the transfer device, an action of evacuation in an opposite direction from the fitting engagement direction, an action of stopping the transfer, or an action of combination of these actions, etc. In this embodiment, the control unit 21 performs an action of stopping the robot 10.

In the meantime, the control unit 21 determines whether or not the operation of fitting engagement has been completed (for example, determines whether or not the distance of progress in the Z-direction has exceeded a predetermined value) (step S1-10). When the operation of fitting engagement has been completed, then the control unit 21 sends a predetermined movement command and/or action command to the arm 10*a* and the hand 30 (step S1-11). As a result of this, the hand 30 releases the component 110 and moves away from the component 110, so that the hand 30 is moved by the arm 10*a* to a stand-by position or a place where a next component 110 is stocked.

It should be noted that, in the above-described embodiment, the control unit 21 may perform wide range detection processing to detect the second feature value in the first range in the image data on the basis of the feature value detection program 23*e* and may subsequently perform narrow range detection processing in the second range in the image data that will be subsequently obtained. The narrow range detection processing refers to a process of detecting the second feature value within the second range which is narrower than the first range. For example, when the difference between the first feature value and the second feature value is large, the wide range detection processing is performed, and, when the difference between the first feature value and the second feature value becomes equal to or smaller than a predetermined value, the narrow range detection processing is performed. As a result of this, when the difference between the first feature value and the second feature value becomes small, it is made possible to achieve improved processing speed and improved processing accuracy, etc.

Independently of this process or in conjunction with this process, the control unit 21 may set an area that includes the target 102 to be followed detected in the image data as the detection area of the second feature value on the basis of the feature value detection program 23e. For example, the detection area can be set by setting a bounding rectangle in contact with the contour of the detected target 102 to be followed and enlarging the bounding rectangle at a predetermined magnification. In addition, the aforementioned magnification may be changed in accordance with the dimensions (size) of the target 102 to be followed in the image data, the distance between the visual sensor 50 and the target 102 to be followed, etc. For example, when the visual sensor 50 and the target 102 to be followed are moved to be closed to each other, the amount of movement on the image of the target 102 to be followed within the image data increases, so that the aforementioned magnification is increased. As a result of this, detection of the position and the orientation of the target 102 to be followed is made efficient and accurate.

Figure 5:
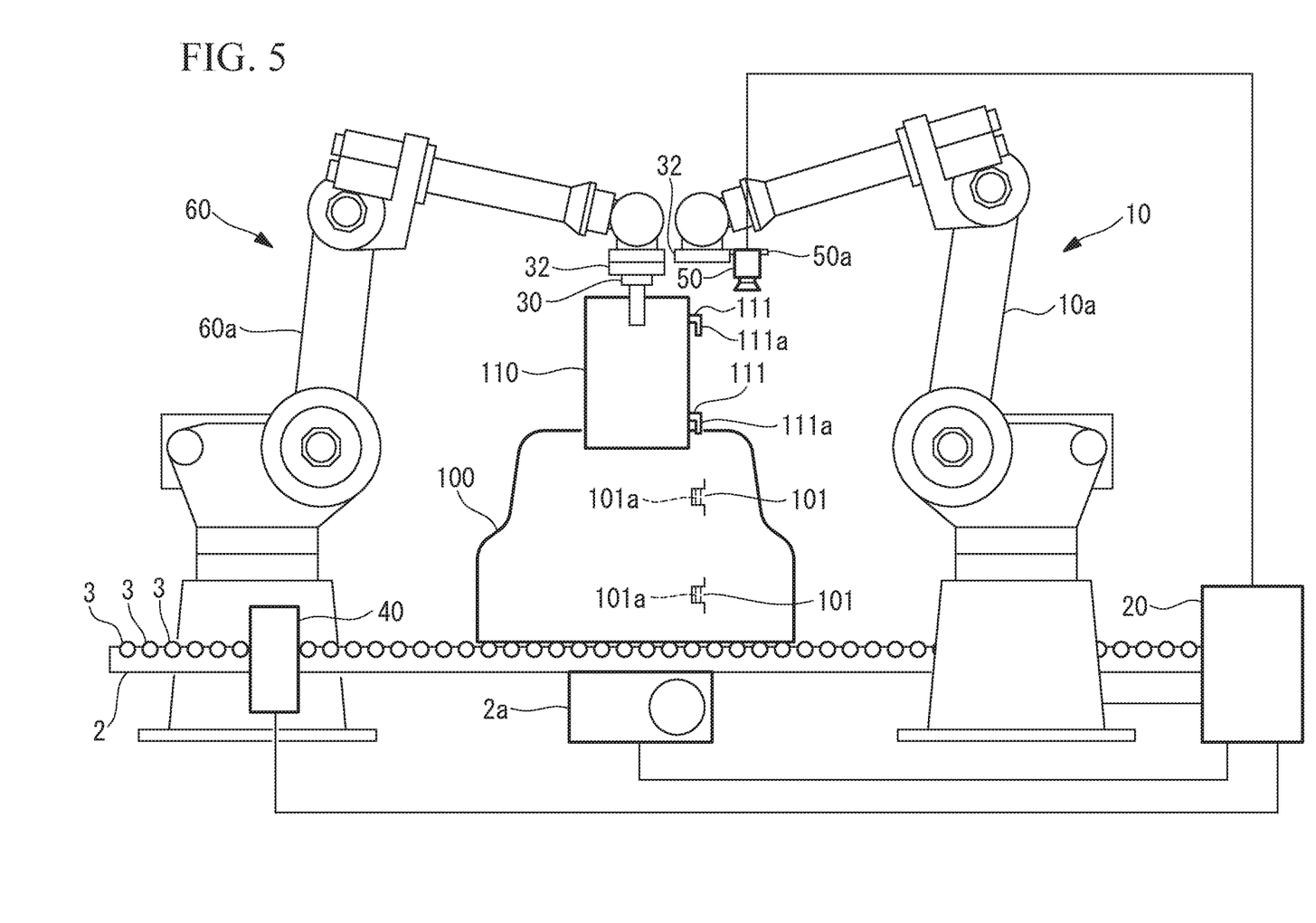
FIG. 5 is a schematic configuration view of a work robot system of a modified example of this embodiment.

Also, as illustrated in FIG. 5, the hand 30, which is a tool, may be mounted on the work robot 60 which is another robot. In this case, the arm 60a of the work robot 60 and the hand 30 are controlled by the controller 70. In one example, the controller 70 has the same configuration as that of the controller 20 and the arm 60a also has the same configuration as that of the arm 10a. The position and the direction of the coordinate system of the visual sensor 50 and the position and the direction of the coordinate system of the robot 60 correspond to each other in the controller 70. In a state where the control unit 21 causes the visual sensor 50 to follow the target 102 to be followed, the controller 70 causes the robot 60 to operate in the coordinate system of the robot 60. Since the position and the orientation of the coordinate system of the robot 60 changes according to the position and the orientation in the coordinate system of the visual sensor 50, the controller 70 can perform tasks using the operation program 23b configured on the basis of the coordinate system of the robot 60.

In this case as well, as described above, when the controller 20 causes the position and the orientation of the visual sensor 50 to follow the target 102 to be followed, the information of the movement command, it is possible to cause the position and the orientation in the coordinate system of the robot 60 to follow the work-target portion 101 on the basis of the information or the like of the difference between the second feature value and the first feature value. As a result, when the robot 60 performs the task of bringing the shafts 111a of the component 110 in to fitting engagement with the holes 101a of the article 100 on the basis of the operation program 23b, the hand 30 of the robot 60 follows the article 100.

It should be noted that the controller 20 and the controller 70 may be connected to a host control system such as a production management system or the like and transmission of the aforementioned information between the controller 20 and the controller 70 may take place via the host control system.

It should be noted that, in place of the robot 60, it is also possible to use a robot that includes rails arranged along the transfer device 20 and above the transfer device 20 and a movable arm movably mounted to the rails. In this case, the visual sensor 50 is mounted at the distal end of the movable arm, and the movable arm is configured such that the orientation of its distal end and the orientation of the visual sensor 50 can be changed for example about the X-axis and about the Y-axis. While the movable arm is preferably configured such that the positions of its distal end and the visual sensor 50 can be movable in the Y-axis direction, the movable arm does not need to be configured such that the positions of its distal end and the visual sensor 50 can be freely moved in the Y-axis direction.

In this case as well, the position and the orientation of the visual sensor 50 mounted on the movable arm can follow the target 102 to be followed. It should be noted that, even in a case where the distal end of the movable arm does not freely move in the Y-axis direction, the position in the X-axis direction and the orientation about the X-axis and the Y-axis of the visual sensor 50 mounted on the movable arm can follow the target 102 to be followed on the basis of the difference between the second feature value and the first feature value. If the following is possible, even in a case where the target 102 to be followed moves in the Y-axis direction in the image data, the movement amount can be detected and similar operation and effects as those described in the foregoing can be achieved.

It should be noted that the shape or the like of the target 102 to be followed may be additionally detected as the second feature value. In this case, the first feature value regarding the shape or the like of the target 102 to be followed is stored in the storage unit 23. Since the shape of the target 102 to be followed varies depending on the distance between the arm 10a and the target 102 to be followed and the angle, the following control will be more accurately implemented.

It should be noted that it is also possible to use a plurality of visual sensors 50 to cause the plurality of visual sensors 50 to individually follow a plurality of targets 102 to be followed. In this case, when the target 102 to be followed is arranged at the individual predetermined positions in the plurality of pieces of image data obtained by the plurality of visual sensors 50, it is also possible to determine that the hand 30 mounted on the arm 10a has been arranged with a predetermined position and a predetermined orientation relative to the work-target portion 101 of the article 100.

As has been described in the foregoing, the robot 10 of this embodiment includes the one or more visual sensors 50 provided on the arm 10a and the storage unit 23 that stores the first feature value as the target data for causing the visual sensor 50 provided on the arm 10a to follow the target 102 to be followed. In addition, in this embodiment, the second feature value regarding the at least the current position and the current orientation of the target 102 to be followed is detected using the image obtained by the visual sensor 50. In addition, the movement command for the arm 10a is calculated on the basis of the difference between the second feature value and the first feature value. Also, while the visual sensor 50 is made to follow the target 102 to be followed, the computation of the movement command and the movement of the arm based on the movement command are repeated. By virtue of this, the relative position and the relative orientation of the hand 30 relative to the article 100 transferred by the transfer device 2 can be gradually moved so as to be closer to the target data. This is useful for causing the movement of the arm 10a of the robot 10 to accurately follow the article 100 transferred by the transfer device 2.

Also, in this embodiment, the model of the target 102 to be followed is stored as the first feature value. If the feature section of the article 100 is the target 102 to be followed, the control unit 21 can obtain the position and the orientation (second feature value) of the feature section in the image data by performing matching search between the feature section in the image data obtained by the visual sensor 50 and the projective-transformation model. This feature is useful for causing the relative position and the relative orientation of the visual sensor 50 relative to the target 102 to be followed of the article 100 transferred by the transfer device 2 to be made closer to the target data accurately. It should be noted that the feature section may be a figure provided on the surface of the article 100.

Also, in this embodiment, the movement command is adjusted using at least the feedforward control. According to this feature, control is implemented which takes into account the tendency of movement or the like of the article 100 by the transfer device 2 through the feedforward control, which is useful in causing the relative positions and the relative orientations of the visual sensor 50 relative to the target 102 to be followed of the article 100 to be made closer to the target data quickly and accurately.

Also, in this embodiment, before the detection of the second feature value is performed, the control unit 21 calculates a pre-task movement command for bringing the target 102 to be followed into the detection area of the visual sensor 50 using the data obtained by the visual sensor 50 or another sensor 40. As a result, before the following control of the arm 10a is performed, the visual sensor 50 will be arranged at the position necessary for the following in a short period of time.

Also, the work robot system of this embodiment includes the transfer device 2 and the robot 10, and the robot 10 performs the predetermined task on the article 100 in a state where the visual sensor 50 provided on the robot 10 is following the target 102 to be followed. Alternatively, in the work robot system of this embodiment, the work robot 60 performs the predetermined task on the article 100 while using the information of the movement command for causing the visual sensor 50 provided on the robot 10 to follow the target 102 to be followed or the information that has been used in the computation of the movement command. When the work robot 60 is used, it is made possible to perform the predetermined task on the article 100 in a place away from the visual sensor 50. It should be noted that a plurality of work robots 60 may perform the predetermined task on the article 100 using the aforementioned information.

Also, the work robot system of this embodiment further includes the force sensor 32 that detects the force created by the contact of the component 110 supported by the robot 10 or the hand 30 with the article 100, the force created by the contact of the component 110 supported by the work robot 60 or the hand 30 with the article 100. Also, the controller 20, 70 of the robot 10 or the work robot 60 causes the robot 10 or the hand 30 provided on the work robot 60 to follow the article using the detection value of the force sensor 32 as well when the predetermined task is performed.

Since the detection value of the force sensor 32 is also used in the following control, the accuracy of the following control can be further improved. Here, in some cases, it may be difficult to ensure the correspondence between the relative orientation of the hand 30 relative to the article 100 and the detection value of the force sensor 32, but the relative orientation is corrected in this embodiment, so that the accuracy of the following control is effectively enhanced.

Also, according to the work robot system of this embodiment, when second feature value varies beyond a predetermined criterion, at least either of the controllers 20, 70 of the robot 10 or the work robot 60 performing the predetermined task and the transfer device 2 performs the abnormality response action. As a result of this, damage to the robots 10, 60, the article 100, and the component 110 can be effectively prevented while the following control is being performed.

Also, according to the work robot system of this embodiment, the target 102 to be followed constitutes a part of the article 100. According to this feature, the position of the target 102 to be followed in the article 100 is fixed, which is useful in further enhancing the accuracy of the following control.

Also, a machining tool may be supported by the distal end of the robot 10 or the work robot 60, and the robot 10 or the work robot 60 may perform, as the predetermined task, machining on the article 100 transferred by the transfer device 2. In this case, the machining tool may be drills, milling cutters, drill taps, deburring tools, other tools, etc. In this case as well, in the step S1-2, the machining tool is moved close to the work-target portion 101, the aforementioned following control is performed, and the force control is performed in accordance with the contact between the machining tool and the work-target portion 101, and effects similar to those described above can be thereby achieved. Also, the machining tool may be welding guns, welding torches, etc.

It is also possible to use, as the transfer device 2, a transfer device that transfers the article 100 along a curved route, or a transfer device that transfers the article 100 along a winding route. In these cases as well, the control unit 21 can cause the distal end of the robot 10 or the work robot 60 to follow the work-target portion 101 by using the detection result of the visual sensor 50. Also, when the position of the work-target portion 101 relative to the robot 10 varies beyond the predetermined criterion in the step S1-6, the control unit 21 can perform the first abnormality-response action in step S1-7. By virtue of this, even in a case where the aforementioned transfer device is used, effects similar to those described above can be achieved.

Also, in place of the transfer device 2, another robot, an AGV (automated guided vehicle) may move the article 100. In this case as well, operation and effects similar to those described above can be achieved. Further, if the article 100 is an automobile, a frame of an automobile, or the like, the article 100 on which the predetermined task is performed may be moved by its engine, wheels, or the like. In these cases, the other robot, the engine, the wheels, and the like will function as the transfer device.

Also, in place of the transfer device 2, a chute may be used to transfer the article 100, where the article 100 slides down, rolls down, or falls due to gravity on the chute. In this case, the sloping chute may be made to be oscillated by any oscillation-imparting device, by virtue of which the movement of the article 100 on the chute can be made smoother. In these cases, the chute, the oscillation-imparting device, or the like functions as the transfer device, and the article 100 that is moved by the chute is picked by the tool mounted on the robot 30.

In this embodiment, the force sensor 32 is mounted at the distal end of the robot 10 or the work robot 60. On the other hand, it is also possible to dispose the force sensor 32, for example, between the transfer device 2 and the article 100 or inside the article 100 or the like. In this case as well, the force control based on the detection value of the force sensor 32 can be performed, and effects similar to those described above can be thereby achieved.

Also, the visual sensor 50 may be mounted at a part of the robot 10 or the work robot 60 other than the wrist flange.

It should be noted that the visual sensor 50 may be a stereo camera. In this case, it is possible to obtain distance image data of the target 102 to be followed by means of a pair of cameras, and the position and the orientation of the target 102 to be followed are identified using the image data and the corresponding three-dimensional model.

While the target to be followed by the visual sensor 50 is different than the work-target of the robot 10 in this embodiment, the target to be followed by the visual sensor 50 may be the same as the work-target of the robot 10. For example, in a case where slight positional deviations are permissible between the tool of the robot 10 and the work-target, if the target to be followed during the task by the tool can always be seen by the visual sensor 50 or in any other similar cases, then the target to be followed and the work-target can be handled as one and the same target.

It should be noted that, in the above-described embodiment, the position, the orientation, and the size of the target 102 to be followed are arranged at the target position on the image data of the visual sensor 50 and thereby the position and the orientation of the hand 30, which is a tool, is arranged at the position and with the orientation necessary for the predetermined task on the article 100. In contrast, the position and the orientation of the target 102 to be followed may be arranged at the target position on the image data of the visual sensor 50 and thereby the position and the orientation of the tool mounted on the robot 10 may be arranged at the position and with the orientation necessary for the predetermined task. For example, in the case of a task in which the distance between the tool and the article hardly changes such as laser welding, laser machining, sealant application, and the like, a case where the intended task can be performed even when the distance between the tool and the article changes, and in other relevant cases, the information of the size as the first feature value and the information of the size as the second feature value do not need to be used.

The invention claimed is:

1. A following robot comprising:
   a movable arm;
   one or more visual sensors provided on the arm;
   a storage unit that stores a first feature value regarding at least a position and an orientation of a following target, the first feature value being stored as target data for causing the visual sensors provided on the arm to follow the following target;
   a feature value detection unit that detects a second feature value regarding at least a current position and a current orientation of the following target, the second feature value being detected using an image obtained by the visual sensors;
   a movement amount calculation unit that calculates a movement command for the arm based on a difference between the second feature value and the first feature value; and
   a movement command unit that moves the arm based on the movement command,
   wherein the movement amount calculation unit and the movement command unit repeat calculation of the movement command and movement of the arm based on the movement command while the visual sensor is made to follow the following target,
   wherein the movement command is a command that reduces or eliminates a difference between the orientation of the following target as the second feature value and the orientation of the following target as the first feature value.

2. The following robot according to claim 1, wherein the movement amount calculation unit adjusts the movement command using at least feedforward control.

3. The following robot according to claim 1, wherein the movement amount calculation unit adjusts the movement command based on a parameter defined according to a mechanical characteristic of the arm.

4. The following robot according to claim 1, wherein a control unit calculates a pre-task movement command using data obtained by the visual sensor or another sensor before detection of the second feature value is performed, wherein the pre-task movement command is a command for the following target to enter a predetermined range in a detection area of the visual sensor or within the detection area; and
   the movement command unit moves the arm based on the pre-task movement command before a following operation to cause the arm to follow the following target.

5. The following robot according to claim 1, wherein the feature value detection unit performs wide range detection processing to detect the second feature value in a first range in images obtained by the visual sensor and subsequently performs narrow range detection processing to detect the second feature value in a second range that is narrower than the first range in images obtained by the visual sensor.

6. A work robot system comprising:
   a transfer device that transfers an article; and
   the following robot according to claim 1,
   wherein, in a state where the visual sensor of the following robot is following the following target, the following robot performs a predetermined task on the article, or a work robot, which is another robot, performs the predetermined task on the article by using information of the movement command to cause the visual sensor of the following robot to follow the following target or information used in calculation of the movement command.

7. The work robot system according to claim 6, further comprising a force detector that detects force generated when a part or tool supported by the following robot performing the predetermined task is brought into contact with the article or force generated when a part or tool supported by the work robot is brought into contact with the article, and
   a controller of the following robot or the work robot performing the predetermined task causes the following robot or the work robot to follow the article when the predetermined task using a detected value of the force detector is performed.

8. The work robot system according to claim 6, wherein at least either of a controller of the following robot or the work robot performing the predetermined task and the transfer device performs an abnormality response action when the second feature value varies beyond a predetermined criterion.

9. The work robot system according to claim 6, wherein the following target is part of the article.

* * * * *